US012801506B2

(12) United States Patent
Li et al.

(10) Patent No.: US 12,801,506 B2
(45) **Date of Patent: *Nov. 17, 2026**

(54) PROTECTION APPARATUS AND METHOD FOR IMAGE DATA PROCESSING MODULE, AND ELECTRONIC DEVICE

(71) Applicant: Horizon Journey (Shanghai) Technology Co., Ltd., Shanghai (CN)

(72) Inventors: Jing Li, Shanghai (CN); Yi Zhou, Shanghai (CN); Wenxing Li, Shanghai (CN)

( * ) Notice: Subject to any disclaimer, the term of this patent is extended or adjusted under 35 U.S.C. 154(b) by 98 days.

This patent is subject to a terminal disclaimer.

(21) Appl. No.: 18/841,273

(22) PCT Filed: Feb. 23, 2023

(86) PCT No.: PCT/CN2023/077985
§ 371 (c)(1),
(2) Date: Aug. 23, 2024

(87) PCT Pub. No.: WO2023/160635
PCT Pub. Date: Aug. 31, 2023

(65) Prior Publication Data

US 2025/0173234 A1 May 29, 2025

(30) Foreign Application Priority Data

Feb. 25, 2022 (CN) ........................ 202210183590.0

(51) Int. Cl.
*G06F 11/30* (2006.01)
*G06F 11/32* (2006.01)

(52) U.S. Cl.
CPC ........ *G06F 11/3041* (2013.01); *G06F 11/327* (2013.01)

(58) Field of Classification Search
CPC .......................... G06F 11/3041; G06F 11/327
See application file for complete search history.

(56) References Cited

U.S. PATENT DOCUMENTS 5,410,546 A 4/1995 Boyer et al.
6,961,366 B1 * 11/2005 Bendak .............. H04L 25/0272 455/7

(Continued)

FOREIGN PATENT DOCUMENTS

CN 103647966 A 3/2014
CN 109064768 A 12/2018

(Continued)

OTHER PUBLICATIONS

International Search Report and Written Opinion for corresponding International PCT Application No. PCT/CN2023/077985, dated May 29, 2023.

(Continued)

*Primary Examiner* — Henry Tsai
*Assistant Examiner* — John B Roche
(74) *Attorney, Agent, or Firm* — K&L Gates LLP

(57) ABSTRACT

Disclosed in the embodiments of the present disclosure are a protection apparatus and method for an image data processing module, an electronic device. The apparatus includes: an input monitoring module, which is connected to an input end of the image data processing module, and is used for monitoring an input of the image data processing module, so as to obtain an input monitoring result; an output monitoring module, which is connected to an output end of the image data processing module, and is used for monitoring an output of the image data processing module, so as to obtain an output monitoring result; and a monitoring result processing module, which is respectively connected to the input monitoring module and the output monitoring module and is used for determining the operating state of the image data processing module on the basis of the input monitoring result and the output monitoring result.

20 Claims, 7 Drawing Sheets

(56) References Cited

U.S. PATENT DOCUMENTS

| | | | | |
|---|---|---|---|---|
| 12,119,072 | B2 * | 10/2024 | Li | G06F 11/1004 |
| 2004/0049726 | A1 * | 3/2004 | Goyins | G06F 11/1008<br>714/E11.035 |
| 2007/0133899 | A1 | 6/2007 | Rai et al. | |
| 2009/0021303 | A1 * | 1/2009 | Vinayak | H03F 1/32<br>330/149 |
| 2014/0152679 | A1 | 6/2014 | Raita et al. | |
| 2015/0309897 | A1 * | 10/2015 | Shan | G06F 11/3024<br>714/10 |
| 2020/0379877 | A1 | 12/2020 | Kwong et al. | |

FOREIGN PATENT DOCUMENTS

| | | | |
|---|---|---|---|
| CN | 110800309 | A | 2/2020 |
| CN | 113099176 | A | 7/2021 |
| CN | 113160026 | A | 7/2021 |
| CN | 114564356 | A | 5/2022 |
| WO | 2013021608 | A1 | 2/2013 |
| WO | 2021035643 | A1 | 3/2021 |
| WO | 2023160635 | A1 | 8/2023 |

OTHER PUBLICATIONS

Extended European Search Report from the corresponding European Patent Application No. 23759257.1, mailed on Apr. 8, 2025.

First Japanese office action from the corresponding Japanese patent application No. 2024-549205, mailed on Sep. 9, 2025 and its English translation.

First Chinese office action from the corresponding Chinese patent application No. 2022101835900, mailed on Dec. 28, 2024 and its English translation.

* cited by examiner

PROTECTION APPARATUS AND METHOD FOR IMAGE DATA PROCESSING MODULE, AND ELECTRONIC DEVICE

This application is a U.S. National Stage Entry under 35 U.S.C. § 371 of International Patent Application No. PCT/CN2023/077985, entitled PROTECTION APPARATUS AND METHOD FOR IMAGE DATA PROCESSING MODULE, AND ELECTRONIC DEVICE, filed Feb. 23, 2023, which claims priority to Chinese Patent Application No. 202210183590.0, filed on Feb. 25, 2022, entitled "PROTECTION APPARATUS AND METHOD FOR IMAGE DATA PROCESSING MODURE, AND ELECTRONIC DEVICE, the entire contents of which are incorporated herein by reference.

FIELD OF THE PRESENT DISCLOSURE

The present disclosure relates to image processing technology, and more particularly, to a protection apparatus and method for an image data processing module, and an electronic device and a medium.

BACKGROUND OF THE PRESENT DISCLOSURE

In the field of automatic driving, etc. which has high requirements for the functional security of an image data processing module, in order to ensure the hardware functional security of the image data processing module, two sets of the hardware logic of image data processing modules are usually set in way of hardware redundancy, and mutually verified. However, the hardware redundancy results in greater hardware overheads and power consumption.

SUMMARY OF THE PRESENT DISCLOSURE

In order to solve the technical problem of the greater hardware overheads and power consumption overheads caused by the above-mentioned hardware redundancy, the present disclosure is proposed. In the embodiments of the present disclosure, a protection apparatus and a protection method for an image data processing module, and an electronic device and a medium are provided.

According to an aspect of an embodiment of the present disclosure, a protection apparatus for an image data processing module is provided, including: an input monitoring module, connected to an input end of the image data processing module, for monitoring an input of the image data processing module to obtain an input monitoring result; an output monitoring module, connected to an output end of the image data processing module, for monitoring an output of the image data processing module to obtain an output monitoring result; and a monitoring result processing module, connected to the input monitoring module and the output monitoring module, respectively, for determining an operating state of the image data processing module based on the input monitoring result and the output monitoring result.

According to another aspect of an embodiment of the present disclosure, a protection method for an image data processing module is provided, including: monitoring an input of the image data processing module to obtain an input monitoring result; monitoring an output of the image data processing module to obtain an output monitoring result; and determining an operating state of the image data processing module based on the input monitoring result and the output monitoring result.

According to still another aspect of an embodiment of the present disclosure, a computer-readable storage medium is provided, on which a computer program is stored for executing the protection method for the image data processing module according to any one of the above embodiments of the present disclosure; or on which data is stored required by at least one hardware logic circuit of the protection apparatus for the image data processing module according to any one of the above embodiments of the present disclosure, so that the hardware logic circuit is capable of performing a corresponding function when operating.

According to yet another aspect of an embodiment of the present disclosure, an electronic device is provided, including: a processor; a memory configured for storing processor-executable instructions; wherein the processor is configured for reading the executable instructions from the memory and executing the executable instructions to implement the protection method for the image data processing module according to any one of the above embodiments of the present disclosure; or wherein the electronic device further includes a protection apparatus for the image data processing module according to any of the above embodiments; wherein at least one module of the protection apparatus for the image data processing module is implemented by a hardware logic circuit; wherein at least one unit of at least one module is implemented by the hardware logic circuit; or wherein at least one sub-unit of the at least one unit is implemented by the hardware logic circuit.

Based on the protection apparatus and method for the image data processing module, the electronic device and the medium provided by the above-mentioned embodiments of the present disclosure, the operating state of the image data processing module is effectively monitored by monitoring an input and an output of the image data processing module and determining an operating state of the image data processing module according to the monitoring result. A corresponding error alarm signal is output if the operating state generates an error, without performing redundant hardware setting on the image data processing module, so as to realize effective reduction of hardware overheads and power consumption overheads on the basis of ensuring the functional security of the image data processing module.

The technical solutions of the present disclosure are described in further detail below with reference to the accompanying drawings and embodiments.

BRIEF DESCRIPTION OF THE DRAWINGS

The above and other objects, features and advantages of the present disclosure will become more apparent by describing in detail embodiments thereof with reference to the accompanying drawings. The accompanying drawings, which provide a further understanding of embodiments of the disclosure and are incorporated in and constitute a part of this specification, serve to explain the disclosure together with the description and not to limit the disclosure. In the drawings, like reference numerals generally refer to like parts or steps.

DESCRIPTION OF THE EMBODIMENTS

Figure 1:
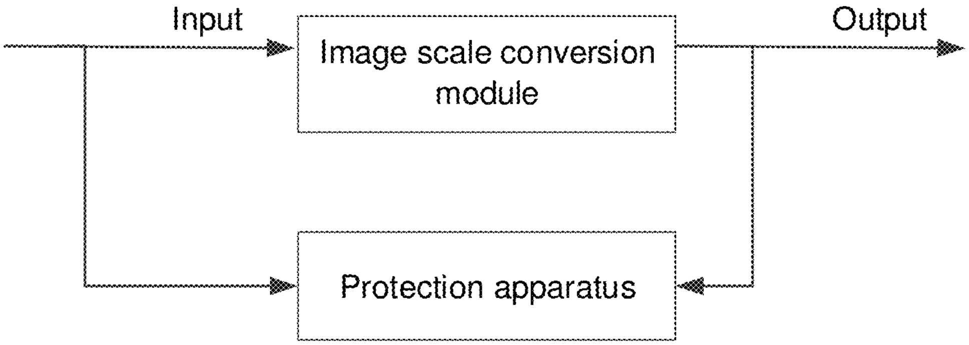
FIG. 1 is an exemplary application scenario of a protection apparatus for an image data processing module provided in the present disclosure.

Exemplary embodiments of the present disclosure are described in more detail below with reference to the accompanying drawings. It should be understood that the described embodiments are merely a part of the embodiments of the present disclosure and not all of the embodiments of the present disclosure, and that the present disclosure is not to be limited to the exemplary embodiments described herein.

It should be noted that the relative arrangement of parts and steps, numerical expressions and numerical values set forth in these examples do not limit the scope of the disclosure unless specifically stated otherwise.

It will be understood by those skilled in the art that the terms "first", "second", and the like in the embodiments of the present disclosure are used merely to distinguish between different steps, devices, modules, and the like, and are not intended to represent any particular technical meaning or a necessary logical order between them.

It should also be understood that in embodiments of the present disclosure, "plurality" may mean two or more, and "at least one" may mean one, two or more.

The following description of at least one exemplary embodiment is merely exemplary in nature and is in no way intended to limit the present disclosure, its application, or uses. It should be noted that like reference numerals and letters refer to like items in the following figures. Thus, once an item is defined in one figure, further discussion thereof is not required in subsequent figures.

Embodiments of the disclosure may be applicable to electronic devices such as terminal equipment, computer systems, servers, and the like, which may operate with numerous other general purpose or special purpose computing system environments or configurations. Examples of well known terminal devices, computing systems, environments, and/or configurations suitable for use with electronic devices such as terminal devices, computer systems, servers, and the like include, but are not limited to personal computer systems, server computer systems, thin clients, thick clients, hand-held or laptop devices, microprocessor-based systems, set top boxes, programmable consumer electronics, networked personal computers, small computer systems, large computer systems, and distributed cloud computing technology environments that include any of the above, and the like.

An electronic device, such as a terminal device, computer system, server, etc. may be described in the general context of computer system-executable instructions, such as program modules, which may be executed by a computer system. Generally, program modules may include routines, programs, objects, components, logic, data structures, etc. that perform particular tasks or implement particular abstract data types. The computer system/server may be implemented in a distributed cloud computing environment where tasks are performed by remote processing devices that are linked through a communications network. In the distributed cloud computing environment, the program modules may be located on local or remote computing system storage media including storage devices.

Overview of the Disclosure

In the process of implementing the present disclosure, the inventors have found that in the field of automatic driving, etc. which has high requirements for the functional security of an image data processing module, in order to ensure the hardware functional security of the image data processing module, two sets of the hardware logic of image data processing modules are usually set in way of hardware redundancy, and mutually verified. However, the hardware redundancy results in greater hardware overheads and power consumption.

Exemplary Overview

FIG. 1 is an exemplary application scenario of a protection apparatus for an image data processing module provided in the present disclosure. The protection apparatus of the image data processing module is referred to as a protection apparatus. The protected image data processing module is a hardware logic circuit or chip for realizing a certain image data processing function, such as a hardware logic circuit or chip for performing image data processing in a vehicle-mounted computing platform in the field of automatic driving. In this example, the image data processing module takes an image scale conversion module as an example, and is used for performing scale conversion on an image, wherein the scale conversion refers to reducing or enlarging the image. With the protection apparatus of the present disclosure, an input and an output of an image data processing module can be monitored, the effective monitoring of an operating state of the image data processing module is implemented by monitoring an input and an output of the image data processing module and determining the operating state of the image data processing module according to the monitoring result. A corresponding error alarm signal is output if the operating state generates an error, without performing redundant hardware setting on the image data processing module. The hardware overheads and power consumption overhead of the protection apparatus of the present disclosure are far less than that of the redundant image data processing module, thereby realizing that effective reduction of hardware overheads and power consumption overhead on the basis of ensuring the functional security of the image data processing module.

Of course, the protection apparatus of the present disclosure is not only applicable to an image scale transformation module, but also can be applied to any image data processing module in which an output image has characteristic value invariance with respect to an input image, for example, a module for image data processing such as image rotation transformation (pixel position rotation with image pixel value invariance), translation transformation (pixel position parallel movement with image pixel value invariance), mirror transformation, offset transformation (irregular movement). The characteristic value invariance refers to that, in the whole area or partial area of the output image with respect to the input image, the property that the proportion of pixels with different brightness is constant, and the proportion of pixels with different chroma is constant, such as image scale transformation, i.e., zooming in or out the input image. Although the scale changes, the proportion of the number of pixels belonging to different brightness is constant. Based on characteristic value invariance, the input and output are monitored to protect the image data processing module and ensure the correctness of image data processing. Based on this, the protection apparatus of the present disclosure may be applied to the protection of an image data processing module of any scene having the characteristic value invariance in any field, and the specific field or scene is not limited in the present disclosure.

Exemplary Apparatus

Figure 2:
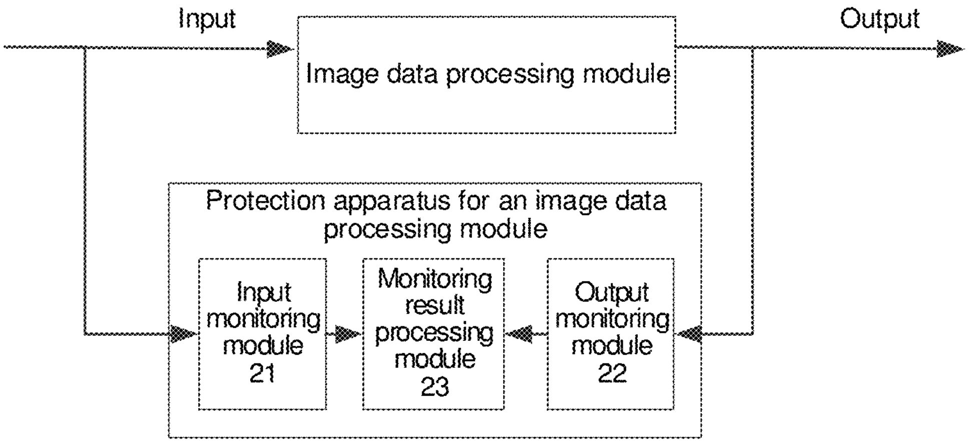
FIG. 2 is a structurally schematic diagram of a protection apparatus for an image data processing module according to an exemplary embodiment of the present disclosure.

FIG. 2 is a structurally schematic diagram of a protection apparatus for an image data processing module according to an exemplary embodiment of the present disclosure. The present embodiment can be applied to an electronic device, specifically such as a vehicle-mounted computing platform. As shown in FIG. 2, the apparatus includes an input monitoring module 21, an output monitoring module 22 and a monitoring result processing module 23.

The input monitoring module 21, connected to an input end of the image data processing module, is configured for monitoring an input of the image data processing module to obtain an input monitoring result.

The output monitoring module 22, connected to an output end of the image data processing module, is configured for monitoring an output of the image data processing module to obtain an output monitoring result.

The monitoring result processing module 23, connected to the input monitoring module 21 and the output monitoring module 22, respectively, is configured for determining an operating state of the image data processing module based on the input monitoring result and the output monitoring result.

The image data processing module is any image processing module having characteristic value invariance. The region where the characteristic value is unchanged is determined in advance, the monitoring rule of the protection apparatus is configured accordingly, and the input and output are monitored. The operating states of the image data processing module may include both correct and incorrect states. When the operating state is correct, it means that the image data processing module operates normally. Otherwise, it means that the image data processing module has an error, and it is necessary to take corresponding measures. An error alarm signal can be output, and CPU processing can be reported in a certain manner, which can be specifically set according to actual requirements.

In an alternative example, the input to the image data processing module may include input image data and, correspondingly, the output may include output image data. Accordingly, the input monitoring module 21 may monitor the input image data to obtain an input monitoring result. The output monitoring module 22 may monitor the output image data to obtain a corresponding output monitoring result. And the monitoring result processing module 23 may determine the operating state of the image data processing module based on the input monitoring result and the output monitoring result.

In an alternative example, the input of the image data processing module may include an input control signal, and the corresponding output includes an output control signal. Thus, the input monitoring module 21 and the output monitoring module 22 may monitor the input control signal and the output control signal, respectively, to obtain an input monitoring result and an output monitoring result.

In an alternative example, the input of the image data processing module includes input image data and an input control signal, and the corresponding output includes output image data and an output control signal. The input monitoring module 21 monitors the input image data and the input control signal to obtain an input monitoring result, and the output monitoring module 22 monitors the output image data and the output control signal to obtain an output monitoring result.

The input control signal is a signal for controlling the input of the input image data, and may include relevant information such as a frame start signal, a frame end signal, a row valid signal of the input image data. The output control signal is a signal for controlling the output of the output image data, and may include relevant information such as a frame start signal, a frame end signal and a row valid signal of the output image data.

According to the protection apparatus for the image data processing module provided in this embodiment, the effective monitoring of the operating state of the image data processing module is implemented by monitoring an input and an output of the image data processing module and determining the operating state of the image data processing module according to the monitoring result. A corresponding error alarm signal is output if the operating state generates an error, without performing redundant hardware setting on the image data processing module, so as to realize effective reduction of hardware overheads and power consumption overhead on the basis of ensuring the functional security of the image data processing module.

Figure 3:
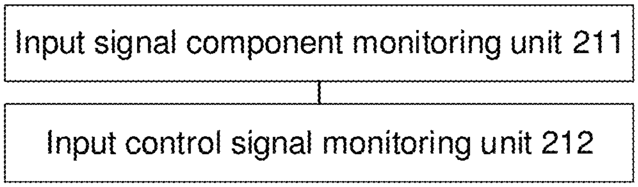
FIG. 3 is a structurally schematic diagram of an input monitoring module 21 provided in an exemplary embodiment of the present disclosure.

FIG. 3 is a structurally schematic diagram of an input monitoring module 21 provided in an exemplary embodiment of the present disclosure.

In an alternative example, the input monitoring module 21 includes: an input signal component monitoring unit 211 configured for sampling component signals of input image data of the image data processing module according to an input control signal of the image data processing module to obtain a first pixel value under each component, and obtaining the number of first pixel values included in each pixel range, to which the first pixel values under each of the components belong, under each of the components as the input monitoring result according to the pixel range.

Herein, the input control signal is a signal for controlling input of the input image data, and may include relevant information such as a frame start signal, a frame end signal, a row valid signal of the input image data. The beginning and end of a frame of the input image may be determined from the input control signal, thereby enabling sampling of the component signals of each frame of the input image. A component refers to a path of an image. For example, if input image data is in a YUV data format, then three components, a Y path, a U path and a V path are included. For further example, if the input image data is in a RGB data format, three components, an R path, a G path and a B path are included. The specific image data format can be set according to actual requirements, and the present disclosure is not limited thereto. The pixel value refers to a pixel characteristic element value, which is a value assigned when an image is digitized and represents luminance and chrominance information about a certain pixel in the image. For example, at the 8 bit bit width, the pixel value is in the range of 0-255. Different grades represent different luminance and chrominance. The present disclosure divides a pixel value range (such as 0-255) into a plurality of pixel ranges, and the specific number of divisions can be set according to actual requirements. For example, the range of 0-255 is divided into 16 ranges (namely, 16 pixel ranges), 32 ranges, etc. and it is not limited in the present disclosure. After the first pixel values under each component in the input image data are collected, each first pixel value can be classified into a corresponding pixel range. For example, a certain first pixel value is 28, and if a total of 16 pixel ranges are divided, including 0-15 (the first range), 16-31 (the second range), 32-47, . . . , 239-255 (the 16th range), then the first pixel value falls within the second range 16-31, thus the pixel range of each first pixel value under each component can be determined according thereto. Further, the number of first pixel values included in each pixel range under each component can be obtained by counting the number of first pixel values included in each pixel range under each component.

The input signal component monitoring unit 211 of the present disclosure may be implemented using any implementable logic circuit or software, and the present embodiment is not limited thereto. In order to ensure real-time data processing, the hardware logic circuit can be used.

In the present disclosure, the first pixel value under each component obtained by sampling the input image data is classified into each pixel range by dividing a plurality of pixel ranges, and counting is performed, so that the proportion of the number of the first pixel values in different pixel ranges can be calculated, and the same calculation is performed on the output image data. Based on the invariability of the characteristic value of the image transformation, the proportion of the number of pixels included in the same pixel range under the same component of the output image data and the input image data should be the same or nearly the same, and thus it can be determined whether the processing process of the input image by the image data processing module is correct. If the proportion of the output image data differs greatly from that of the input image, it indicates that an error has occurred in the image data processing module, and an error alarm signal may be issued.

Figure 4:
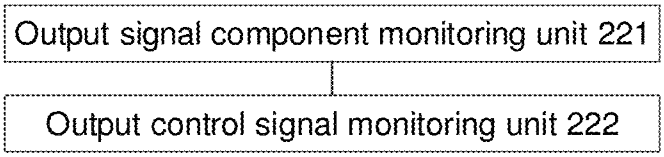
FIG. 4 is a structurally schematic diagram of an output monitoring module 22 provided in an exemplary embodiment of the present disclosure.

FIG. 4 is a structurally schematic diagram of an output monitoring module 22 provided in an exemplary embodiment of the present disclosure.

In an alternative example, the output monitoring module 22 includes: an output signal component monitoring unit 221 configured for sampling component signals of output image data of the image data processing module according to an output control signal of the image data processing module to obtain a second pixel value under each component, and obtaining the number of second pixel values included in each pixel range, to which the second pixel value under each of the components belongs, under each of the components as the output monitoring result according to the pixel range.

The output control signal is a signal for controlling output of the output image data, and may include relevant information such as a frame start signal, a frame end signal and a row valid signal of the output image data.

The operational principle of the output signal component monitoring unit 221 is similar to that of the input signal component monitoring unit 211 and will not be described in detail herein.

The output signal component monitoring unit 221 of the present disclosure may be implemented using any implementable logic circuit or software, and the present embodiment is not limited thereto. In order to ensure real-time data processing, the hardware logic circuit can be used.

It needs to be stated that the monitoring of the input image data and the output image data is configured for monitoring the region where the characteristic value is constant after image data processing. Specifically, for the case where the characteristic value of the whole region of the image is constant, the first pixel value of sampling is the pixel value in the whole input image region, and the second pixel value of sampling is the pixel value in the whole output image region. However, with regard to the case where a translation transformation, an offset transformation, etc. may cause a characteristic value of a partial area of an image to change, for example, the translation transformation may move a partial area of an input image out of the current space and a new part into the current space, which may result in that there is no pixels in the input image corresponding to a partial area of the output image, and there is no pixels in the output image corresponding to a partial area of the input image. In this case, it is necessary to set a sampling area according to the specific function of image data processing, where a first pixel value and a second pixel value of the sampling are areas in the input image and areas in the output image where the characteristic value is unchanged, respectively, that is, the area where only the pixel position changes but the pixel value does not change. For example, in a translation transformation, a left-side partial area A in the input image, after the translation transformation, is transformed to a right-side partial area B in the output image, a first pixel value sampled is a pixel value in the left-side partial area A in the input image, and a second pixel value sampled is a pixel value in the right-side partial area B in the output image. The specific sampling area can be set according to actual requirements, and the present disclosure is not limited thereto.

Figure 5:
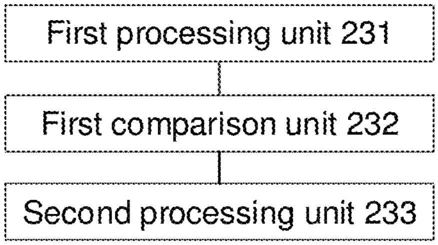
FIG. 5 is a structurally schematic diagram of a monitoring result processing module 23 provided in an exemplary embodiment of the present disclosure.

FIG. 5 is a structurally schematic diagram of a monitoring result processing module 23 provided in an exemplary embodiment of the present disclosure.

In an alternative example, the input monitoring result includes the number of first pixel values included in each pixel range under each component corresponding to the input image data; and the output monitoring result includes the number of second pixel values included in each pixel range under each component corresponding to the output image data. The monitoring result processing module 23 includes a first processing unit 231, a first comparison unit 232 and a second processing unit 233.

The first processing unit 231 is configured for normalizing the number of second pixel values included in each pixel range under each component based on the scaling ratio of the output image data with respect to the input image data to obtain the normalized number of second pixel values included in each pixel range under each component. The first comparison unit 232 is configured for comparing the normalized number of second pixel values included in each pixel range under each component with the number of corresponding first pixel values to obtain a comparison result. The second processing unit 233 is configured for judging whether an error occurs in the image data processing module according to the comparison result, and if so, outputting an error alarm signal.

Herein, since the output image data is obtained by performing a certain transformation on the input image data, in order to be able to determine whether it is abnormal by comparing the number of the first pixel values and the number of the second pixel values of each pixel range under each component, it is necessary to normalize the total number of the second pixel values to be the same as the total number of the first pixel values. For example, if the input image is 100*100 (the number of pixels is 10,000), the output image becomes 50*50 (the number of pixels is 2500) when performing a zoom out on the input image by the image data processing module. Then, normalization may be completed by multiplying the number of second pixel values included in each pixel range under each component by 4. And a comparison result may be obtained by comparing the normalized number of second pixel values with the corresponding number of first pixel values.

Of course, it is also possible to compare the proportion of the number of the first pixel values and the proportion of the number of the second pixel values of each pixel range under each component, without normalization. A specific method can be set according to actual requirements.

The judgement rule for judging whether an error occurs in the image data processing module according to the comparison result can be set according to actual requirements. For example, a quantity difference threshold can be set. When the difference between the normalized number of second pixel values of a certain pixel range under a certain component and the number of corresponding first pixel values exceeds the quantity difference threshold, it is determined that an error occurs.

Alternatively, the first processing unit 231, the first comparison unit 232, and the second processing unit 233 in this example may all be implemented by the hardware logic circuits or software. The present disclosure is implemented using hardware logic circuits in order to ensure real-time performance.

Figure 6:
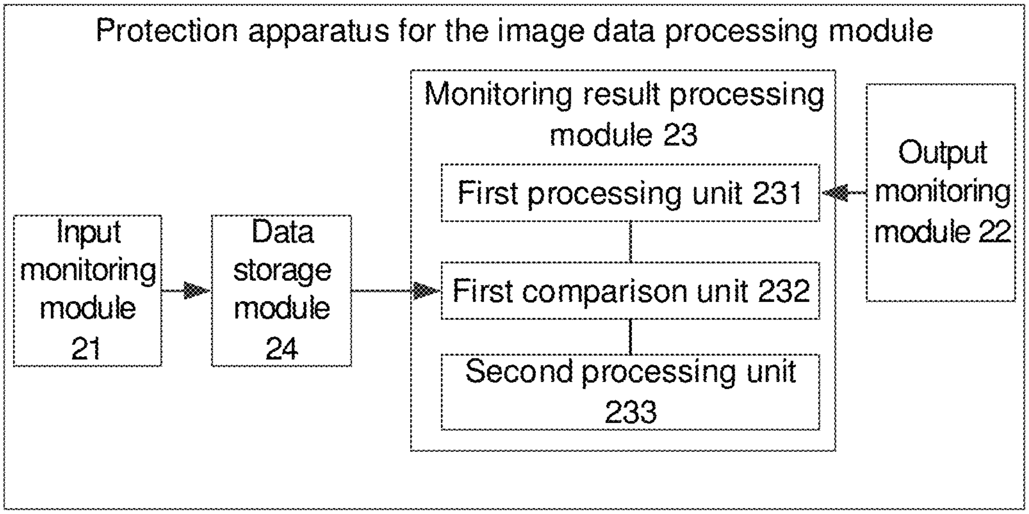
FIG. 6 is a structurally schematic diagram of a protection apparatus for an image data processing module provided in another exemplary embodiment of the present disclosure.

In an alternative example, FIG. 6 is a structurally schematic diagram of a protection apparatus for an image data processing module provided in another exemplary embodiment of the present disclosure. In this example, the apparatus of the present disclosure further includes a data storage module 24. The data storage module 24, connected to the input monitoring module 21 and the first comparison unit 232, respectively, is configured for storing an input monitoring result obtained by the input monitoring module 21. The first comparison unit 232 is configured for reading the number of each first pixel value from the data storage module 24 in response to a read trigger signal of the first processing unit 231, and comparing same with the normalized number of each second pixel value sent by the first processing unit 231 to obtain a comparison result.

The data storage module 24 may be implemented in any implementable manner, such as with a FIFO (first in first out) memory. The FIFO memory stores the number of first pixel values of each pixel range under each component, and numerical values are stored in sequence, i.e., first in, first out, and stored in a loop. A later-stage module needs to send a read request signal, and sequentially reads stored statistical value information. The detailed principle will not be described again.

Alternatively, the statistics on the number of first pixel values can also be implemented using a histogram statistics chip, which can be specifically set according to actual requirements.

The present disclosure facilitates the implementation of hardware logic by normalizing the number of second pixel values of each pixel range under each component to judge whether an error occurs by comparing the number of first pixel values within the same pixel range under the same component with the normalized number of second pixel values.

Figure 7:
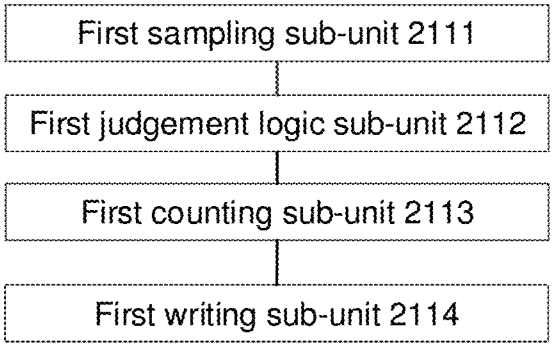
FIG. 7 is a structurally schematic diagram of an input signal component monitoring unit 211 provided in an exemplary embodiment of the present disclosure.

In an alternative example, FIG. 7 is a structurally schematic diagram of an input signal component monitoring unit 211 provided in an exemplary embodiment of the present disclosure. In the present example, the input signal component monitoring unit 211 includes a first sampling sub-unit 2111, a first judgement logic sub-unit 2112, a first counting sub-unit 2113 and a first writing sub-unit 2114.

The first sampling sub-unit 2111 is configured for sampling the first pixel value under each component of input image data. The first judgement logic sub-unit 2112, connected to the first sampling sub-unit 2111, is configured for judging a pixel range to which a first pixel value under each component belongs. The first counting sub-unit 2113, connected to the first judgement logic sub-unit 2112, is configured for counting the first pixel values included in each pixel range under each component to obtain the number of the first pixel values included in each pixel range under each component. The first writing sub-unit 2114, connected to the first counting sub-unit 2113, is configured for writing the number of first pixel values included by each pixel range under each component to the data storage module 24.

The first sampling sub-unit 2111 samples each first pixel value under each component from the input image data according to the pre-set sampling rule, and the sampling rule may be set according to the data format of the input image data to be processed, which will not be described in detail. Each first pixel value is sent to the first judgement logic sub-unit 2112. The first judgement logic sub-unit 2112 judges a pixel range to which the first pixel value belongs, and the first counting sub-unit 2113 counts the number of first pixel values of different pixel ranges under different components. The counting result is written to the data storage module 24 by the first writing sub-unit 2114.

Any one of the first sampling sub-unit 2111, the first judgement logic sub-unit 2112, the first counting sub-unit 2113 and the first writing sub-unit 2114 in the present example may be implemented by hardware or software. In order to ensure real-time performance, the present disclosure is implemented using a hardware logic circuit. For example, the first judgement logic sub-unit 2112 may achieve the determination of the pixel range to which the first pixel value belongs by a combination of a plurality of comparators, and the first counting sub-unit 2113 may be implemented using a counter, which can be specifically set according to actual requirements.

Figure 8:
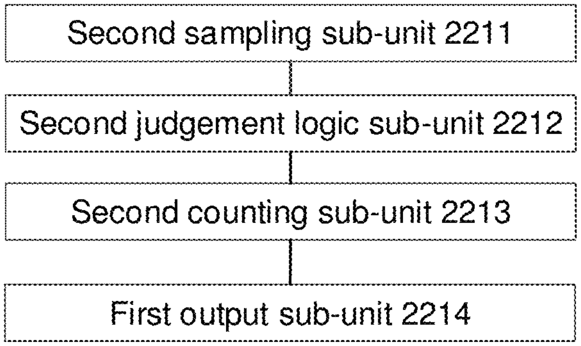
FIG. 8 is a structurally schematic diagram of an output signal component monitoring unit 221 provided in an exemplary embodiment of the present disclosure.

In an alternative example, FIG. 8 is a structurally schematic diagram of an output signal component monitoring unit 221 provided in an exemplary embodiment of the present disclosure. In the present example, the output signal component monitoring unit 221 includes a second sampling sub-unit 2211, a second judgement logic sub-unit 2212, a second counting sub-unit 2213 and a first output sub-unit 2214.

The second sampling sub-unit 2211 is configured for sampling a second pixel value under each component of the output image data. The second judgement logic sub-unit 2212, connected to the second sampling sub-unit 2211, is configured for judging a pixel range to which a second pixel value under each component belongs. The second counting sub-unit 2213, connected to the second judgement logic sub-unit 2212, is configured for counting the second pixel values included in each pixel range under each component to obtain the number of the second pixel values included in each pixel range under each component. The first output sub-unit 2214, connected to the second counting sub-unit 2213 and the monitoring result processing module 23, is configured for outputting the number of second pixel values included in each pixel range under each component to the monitoring result processing module 23. The monitoring result processing module 23 is configured for determining an operating state of the image data processing module based on the input monitoring result and the number of second pixel values included in each pixel range under each component.

The operational principle of the sub-units of the output signal component monitoring unit 221 in this example is similar to the operational principle of the sub-units of the input signal component monitoring unit 211 described above, and will not be described in detail.

Similarly, any of the sub-units in this example may be implemented in both hardware and software, and may be implemented using hardware logic to ensure real-time performance.

In an alternative example, the input monitoring module 21 further includes an input control signal monitoring unit 212 configured for monitoring whether the input control signal of the image data processing module is correct, and if not, outputting a corresponding error alarm signal.

The input control signal includes relevant information such as a frame start signal, a frame end signal and a row valid signal of the input image data. By monitoring the input control signal, the data frame interval time of the input image and the number of rows and columns of each frame of the input image may be detected so as to judge whether an error occurs in the frame interval time, and the number of rows and the number of columns thereof. An error alarm signal may be output when an error occurs.

By monitoring the input control signal, the monitoring effect can be further improved and the operating correctness of the image data processing module can be ensured in the present disclosure.

Figure 9:
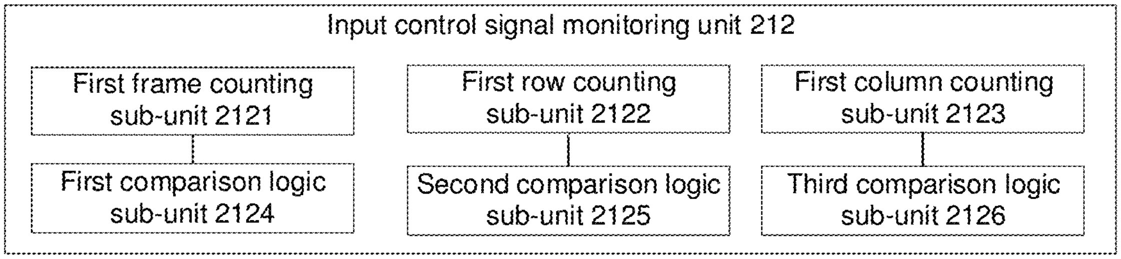
FIG. 9 is a structurally schematic diagram of an input control signal monitoring unit 212 provided in an exemplary embodiment of the present disclosure.

In an alternative example, FIG. 9 is a structurally schematic diagram of an input control signal monitoring unit 212 provided in an exemplary embodiment of the present disclosure. In the present example, the input control signal includes a first frame start signal, a first frame end signal and a first row valid signal of the input image data. The input control signal monitoring unit 212 includes a first frame counting sub-unit 2121, a first row counting sub-unit 2122, a first column counting sub-unit 2123, a first comparison logic sub-unit 2124, a second comparison logic sub-unit 2125, and a third comparison logic sub-unit 2126.

The first frame counting sub-unit 2121 is configured for recording a first frame interval time of input image data according to a first frame start signal and a first frame end signal of the input control signal. The first row counting sub-unit 2122 is configured for recording the number of pixels per row in each frame of the input image data according to the first frame start signal, the first frame end signal and the first row valid signal of the input control signal. The first column counting sub-unit 2123 is configured for recording the number of rows in each frame of the input image data according to the first frame start signal, the first frame end signal and the first row valid signal of the input control signal. The first comparison logic sub-unit 2124, connected to the first frame counting sub-unit 2121, is configured for comparing the first frame interval time with a first pre-set interval time, and outputting a corresponding error alarm signal based on a duration size relationship between the first frame interval time and the first pre-set interval time. The second comparison logic sub-unit 2125, connected to the first row counting sub-unit 2122, is configured for outputting a corresponding error alarm signal based on the size relationship between the number of pixels of each row in each frame of the input image data and the first pre-set number threshold. The third comparison logic sub-unit 2126, connected to the first column counting sub-unit 2123, is configured for outputting a corresponding error alarm signal based on the size relationship between the number of rows in each frame of input image data and the first preset number of rows threshold.

Herein, the first frame start signal represents the start of a frame of an input image. The first frame end signal represents the end of a frame of the input image. The first row valid signal is used for identifying a row of data in the frame of the input image. The pull-down of the first row valid signal represents the end of a row. Based on this, the frame interval time (referred to as a first frame interval time) of the input image data can be timed. Based on the first frame start signal, the first frame end signal and the first row valid signal, the number of pixel rows and columns (i.e., the number of pixels per row) in a frame of the image can be counted. Specifically, the content of a row is identified by the first row valid signal. The number of pixels per row may be determined by counting the pixel values in the row. The start of a row is identified by a pull-up (rising edge) and the end of a row is identified by a pull-down (falling edge) of the first row valid signal, so that the number of rows in the frame image may be counted based on the pull-up and pull-down of the first row valid signal. The principle of triggering counting by different signals is not described in detail. When any one of the first frame interval times is greater than a first pre-set interval time, it is determined that a frame loss error has occurred. When the number of pixels of any one row in any one frame is not equal to a first pre-set number threshold, it is determined that an image column error has occurred. When the number of rows in any one frame is not equal to the first pre-set number threshold, it is determined that an image row error has occurred. The occurrence of any error will generate corresponding error alarm signal, so that relevant personnel can take corresponding measures in time.

The first frame counting sub-unit 2121 resets the count of the frame interval time at the beginning of each frame. The first row counting sub-unit 2122 resets the count of the number of pixels per row at the end of each row. The first column counting sub-unit 2123 resets the count of the number of input image rows per frame at the end of each input image.

In this example, any one of the first frame counting sub-unit 2121, the first row counting sub-unit 2122, the first column counting sub-unit 2123, the first comparison logic sub-unit 2124, the second comparison logic sub-unit 2125 and the third comparison logic sub-unit 2126 may be implemented by hardware or software. In order to ensure real-time performance, it can be implemented by the hardware logic circuit.

In the present disclosure, it may be determined whether an error occurs by counting and comparing the frame interval time, the number of rows and the number of columns per frame of input image data, so that it is possible to further effectively monitor the operating correctness of the image data processing module, and detect an error in time, thereby taking corresponding measures in time.

In an alternative example, the output monitoring module 22 further includes an output control signal monitoring unit 222 configured for monitoring whether the output control signal of the image data processing module is correct, and if not, outputting a corresponding error alarm signal.

The detailed operational principle of the output control signal monitoring unit 222 is similar to the operational principle of the input control signal monitoring unit 212 and will not be described in detail herein.

Figure 10:
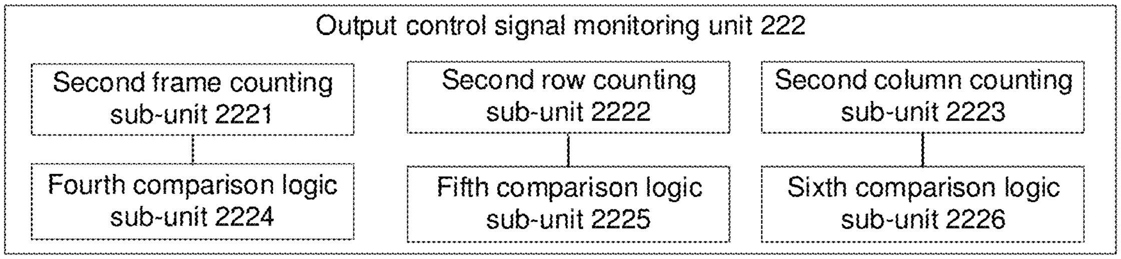
FIG. 10 is a structurally schematic diagram of an output control signal monitoring unit 222 provided in an exemplary embodiment of the present disclosure.

In an alternative example, FIG. 10 is a structurally schematic diagram of an output control signal monitoring unit 222 provided in an exemplary embodiment of the present disclosure. In the present example, the output control signal includes a second frame start signal, a second frame end signal and a second row valid signal of the output image data. The output control signal monitoring unit 222 includes a second frame counting sub-unit 2221, a second row counting sub-unit 2222, a second column counting sub-unit 2223, a fourth comparison logic sub-unit 2224, a fifth comparison logic sub-unit 2225, and a sixth comparison logic sub-unit 2226.

The second frame counting sub-unit 2221 is configured for recording a second frame interval time of outputting image data according to a second frame start signal and a second frame end signal of outputting a control signal. The second row counting sub-unit 2222 is configured for recording the number of pixels per row in each frame of output image data according to the second frame start signal, the second frame end signal and the second row valid signal of the output control signal. The second column counting sub-unit 2223 is configured for recording the number of rows in each frame of output image data according to the second frame start signal, the second frame end signal and the second row valid signal of the output control signal. The fourth comparison logic sub-unit 2224, connected to the second frame counting sub-unit 2221, is configured for comparing the second frame interval time with the second pre-set interval time, and outputting a corresponding error alarm signal based on the relationship between the duration of the second frame interval time and the second pre-set interval time. The fifth comparison logic sub-unit 2225, connected to the second row counting sub-unit 2222, is configured for outputting a corresponding error alarm signal based on the size relationship between the number of pixels of each row in each frame of the output image data and the second pre-set number threshold. The sixth comparison logic sub-unit 2226, connected to the second column counting sub-unit 2223, is configured for outputting a corresponding error alarm signal based on the size relationship between the number of rows in each frame of output image data and the second preset number of rows threshold.

The specific operation of the sub-units of the output control signal monitoring unit 222 in this example is similar to the specific operation of the sub-units of the input control signal monitoring unit 212 described above and will not be described in detail herein.

Any of the sub-units in this example may be implemented in hardware or software, and may be implemented in hardware logic circuits to ensure real-time performance.

In the present disclosure, it may be determined whether an error occurs by counting and comparing the frame interval time, the number of rows and the number of columns per frame of output image data, so that it is possible to further effectively monitor the operating correctness of the image data processing module, and detect an error in time, thereby taking corresponding measures in time.

Figure 11:
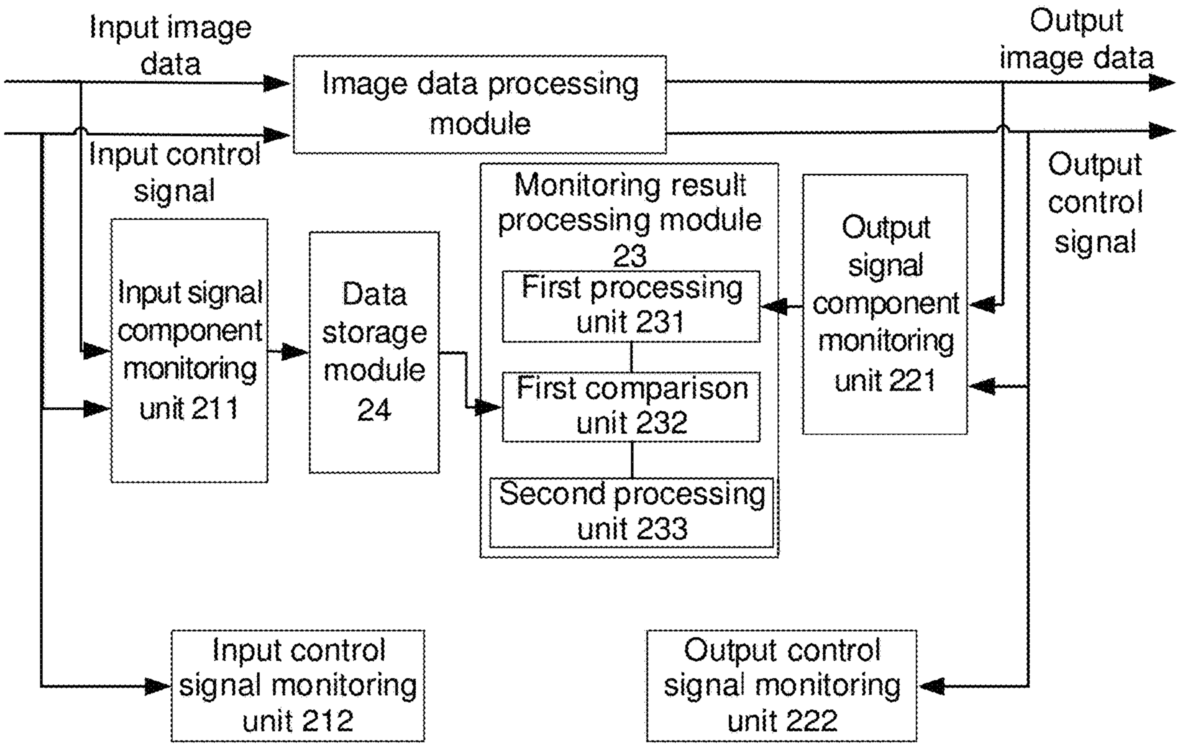
FIG. 11 is a structurally schematic diagram of a protection apparatus for an image data processing module provided in still another exemplary embodiment of the present disclosure.

In an alternative example, FIG. 11 is a structurally schematic diagram of a protection apparatus for an image data processing module provided by still another exemplary embodiment of the present disclosure. In the present example, the input signal component monitoring unit 211 samples component signals of input image data of the image data processing module according to an input control signal of the image data processing module to obtain a first pixel value under each component, and obtains the number of first pixel values included in each pixel range, to which the first pixel value under each component belongs, under each component as the input monitoring result according to the pixel range, and store same in the data storage module 24. The output signal component monitoring unit 221 samples component signals of the output image data of the image data processing module according to an output control signal of the image data processing module to obtain a second pixel value under each component, and obtains the number of second pixel values included in each pixel range under each component as the output monitoring result according to a pixel range to which the second pixel value under each component belongs, and output same to the first processing unit 231. The first processing unit 231 is configured for normalizing the number of second pixel values included in each pixel range under each component based on the scaling ratio of the output image data with respect to the input image data to obtain the normalized number of second pixel values included in each pixel range under each component, and outputting same to the first comparison unit 232 and sending a read trigger signal to the first comparison unit 232. The first comparison unit 232 is configured for reading the number of respective first pixel values from the data storage module 24 in response to a read trigger signal of the first processing unit 231, and comparing same with the normalized number of respective second pixel values sent by the first processing unit 231 to obtain a comparison result and output same to the second processing unit 233. The second processing unit 233 is configured for judging whether an error occurs in the image data processing module according to the comparison result, and if so, outputting an error alarm signal. The input control signal monitoring unit 212 monitors whether the input control signal of the image data processing module is correct, and if not, outputs a corresponding error alarm signal. The output control signal monitoring unit 222 monitors whether the output control signal of the image data processing module is correct, and if not, outputs a corresponding error alarm signal.

In an alternative example, in order to ensure the real-time performance of the protection apparatus, each of the above-mentioned modules, units under each module and sub-units under each unit of the protection apparatus of the present disclosure are all implemented using a hardware logic circuit, so that on the basis of ensuring the functional security of the image data processing module, the hardware overheads and power consumption overhead are effectively reduced, and the real-time performance of an error alarm can be ensured. In applications, relatively serious consequences caused by an error alarm being not timely can be avoided. For example, in the field of automatic driving, an image data processing module of a vehicle-mounted computing platform can be monitored in real time and effectively to detect an error in time and avoid the occurrence of hazards, so that the safety can be effectively improved. With pure hardware implementation, the hardware initialization is required, i.e., initializing a pixel range, a sampling area of the input image, a sampling area of the output image, respective thresholds and other relevant information. After initialization, the system can run automatically without software cooperation.

Exemplary Method

Figure 12:
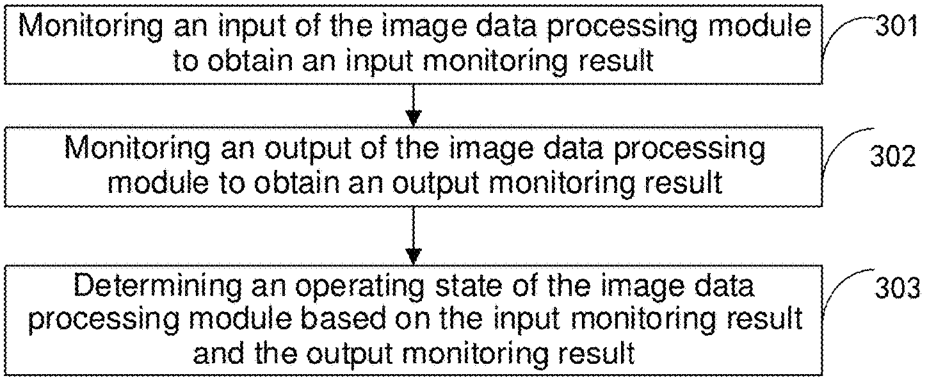
FIG. 12 is a flowchart of a protection method for an image data processing module provided in an exemplary embodiment of the present disclosure.

FIG. 12 is a flowchart illustrating a protection method for an image data processing module provided in an exemplary embodiment of the present disclosure which may be implemented by the device of any of the embodiments described above. As shown in FIG. 12, the method of the present disclosure may include the following steps.

Step 301, monitoring an input of the image data processing module to obtain an input monitoring result;

Step 302, monitoring an output of the image data processing module to obtain an output monitoring result.

Step 303, determining an operating state of the image data processing module based on the input monitoring result and the output monitoring result.

Specific operations of the steps of the method of the present disclosure have been described in detail in the foregoing device embodiments, and will not be repeated here.

Figure 13:
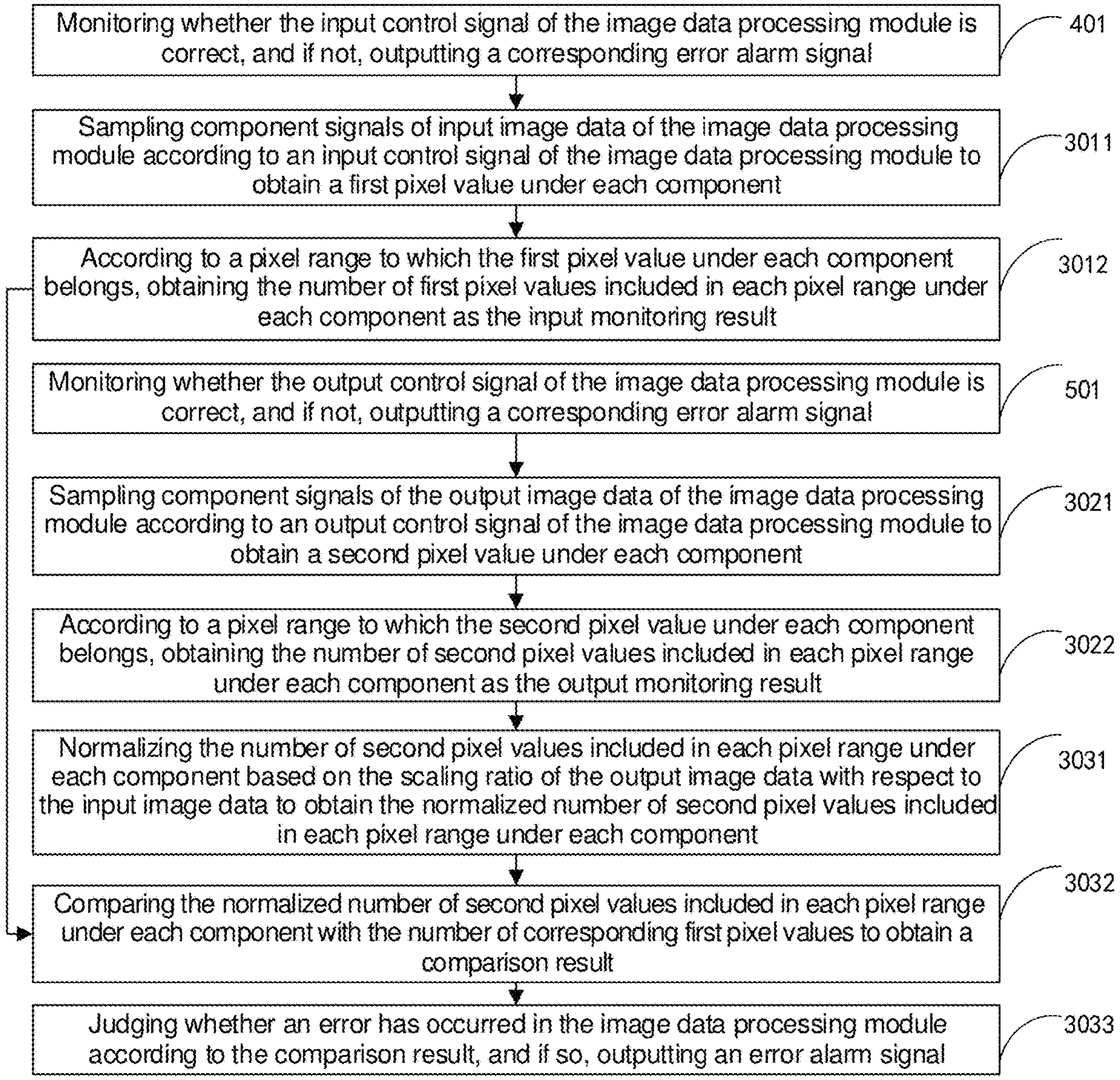
FIG. 13 is a flowchart of a protection method for an image data processing module provided in another exemplary embodiment of the present disclosure.

FIG. 13 is a flowchart of a protection method for an image data processing module provided by another exemplary embodiment of the present disclosure.

In an alternative example, the step 301 of monitoring an input of the image data processing module to obtain an input monitoring result includes the following steps.

Step 3011, sampling component signals of input image data of the image data processing module according to an input control signal of the image data processing module to obtain a first pixel value under each component.

step 3012, according to the pixel range to which the first pixel value under each component belongs, obtaining the number of first pixel values included in each pixel range under each component as an input monitoring result.

In an alternative example, the monitoring an output of the image data processing module to obtain an output monitoring result includes the following steps.

Step 3021, sampling component signals of the output image data of the image data processing module according to an output control signal of the image data processing module to obtain a second pixel value under each component.

Step 3022, according to the pixel range to which the second pixel value under each component belongs, obtaining the number of second pixel values included in each pixel range under each component as an output monitoring result.

In an alternative example, the input monitoring result includes the number of first pixel values included in each pixel range under each component corresponding to the input image data; and the output monitoring result includes the number of second pixel values included in each pixel range under each component corresponding to the output image data. Accordingly, the step 303 of determining an operating state of the image data processing module based on the input monitoring result and the output monitoring result includes the following steps.

Step 3031, normalizing the number of second pixel values included in each pixel range under each of the components based on the scaling ratio of the output image data with respect to the input image data to obtain the normalized number of second pixel values included in each pixel range under each of the components.

Step 3032, comparing the number of normalized second pixel values included in each pixel range under each of the components with the corresponding number of the first pixel values to obtain a comparison result.

Step 3033, judging whether an error occurs in the image data processing module according to the comparison result, and if so, outputting an error alarm signal.

In an alternative example, after the step 301, the method of the present disclosure further includes storing the input monitoring results to a data storage module.

Accordingly, the step 3032 includes reading the number of respective first pixel values from the data storage module and comparing same with the normalized number of respective second pixel values to obtain a comparison result.

In an alternative example, the step 3012 of according to a pixel range to which a first pixel value under each component belongs, obtaining the number of first pixel values included in each pixel range under each component as an input monitoring result, including the following steps: judging a pixel range to which a first pixel value under each component belongs, counting a first pixel value included in each pixel range under each component, and obtaining the number of first pixel values included in each pixel range under each component as an input monitoring result.

In an alternative example, the step 3022 of according to the pixel range to which the second pixel value under each component belongs, obtaining the number of second pixel values included by each pixel range under each component includes the following steps: judging a pixel range to which a second pixel value under each component belongs, counting the second pixel values included in each pixel range under each component to obtain the number of second pixel values included in each pixel range under each component. The step 303 is specifically used for determining an operating state of the image data processing module based on the input monitoring result and the number of second pixel values included in each pixel range under each component.

In an optionally example, the method of the present disclosure further includes:

step 401, monitoring whether the input control signal of the image data processing module is correct, and if not, outputting a corresponding error alarm signal.

The step 401 and the step 301 may be not sequential

Figure 14:
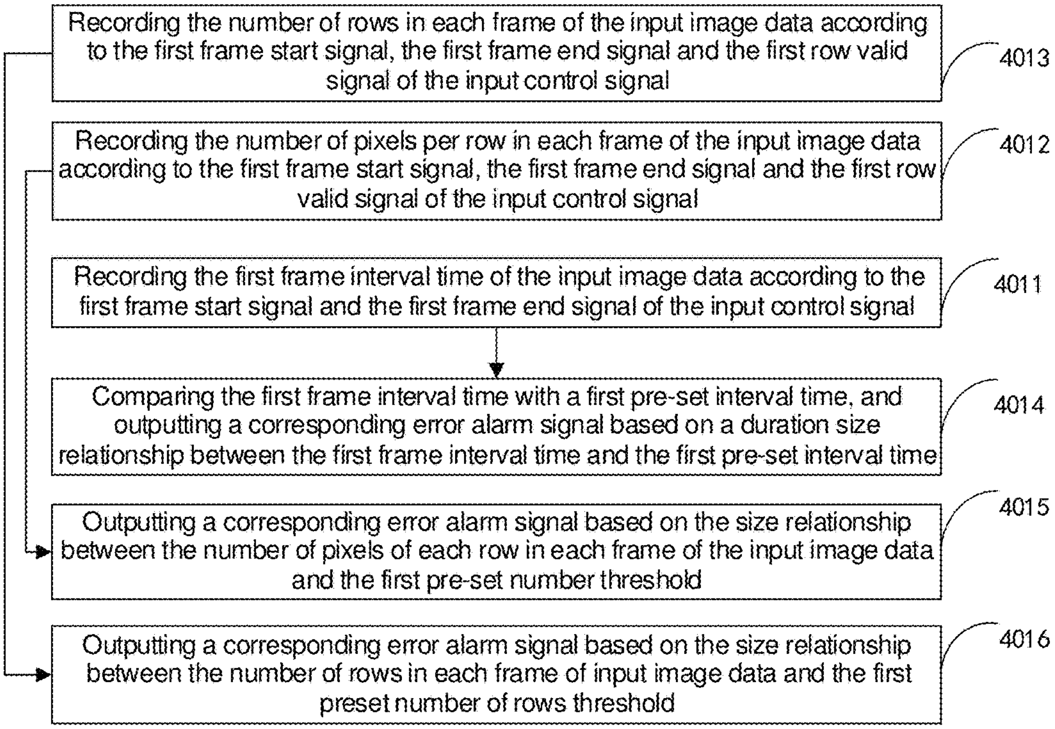
FIG. 14 is a flowchart of Step 401 provided in an exemplary embodiment of the present disclosure.

In an alternative example, FIG. 14 is a flowchart of Step 401 provided in an exemplary embodiment of the present disclosure. In this example, the input control signal includes a first frame start signal, a first frame end signal, and a first row valid signal of the input image data. The step 401 includes the following steps.

Step 4011, recording a first frame interval time of the input image data according to the first frame start signal and the first frame end signal of the input control signal.

Step 4012, recording the number of pixels per row in each frame of the input image data according to the first frame start signal, the first frame end signal and the first row valid signal of the input control signal.

Step 4013, recording the number of rows in each frame of the input image data according to the first frame start signal, the first frame end signal and the first row valid signal of the input control signal.

The steps 4011-4013 may be not sequential.

Step 4014, comparing the first frame interval time with a first pre-set interval time, and outputting a corresponding error alarm signal based on a duration size relationship between the first frame interval time and the first pre-set interval time.

Step 4015, outputting a corresponding error alarm signal based on a size relationship between the number of pixels of each row in each frame of the input image data and a first pre-set number threshold.

Step 4016, outputting a corresponding error alarm signal based on a size relationship between the number of rows in each frame of the input image data and a first preset number of rows threshold.

The steps 4014-4016 may be not sequential.

In an optionally example, the method of the present disclosure further includes the following step.

Step 501, monitoring whether the output control signal of the image data processing module is correct, and if not, outputting a corresponding error alarm signal. The step 501 and the step 302 may be not sequential.

Figure 15:
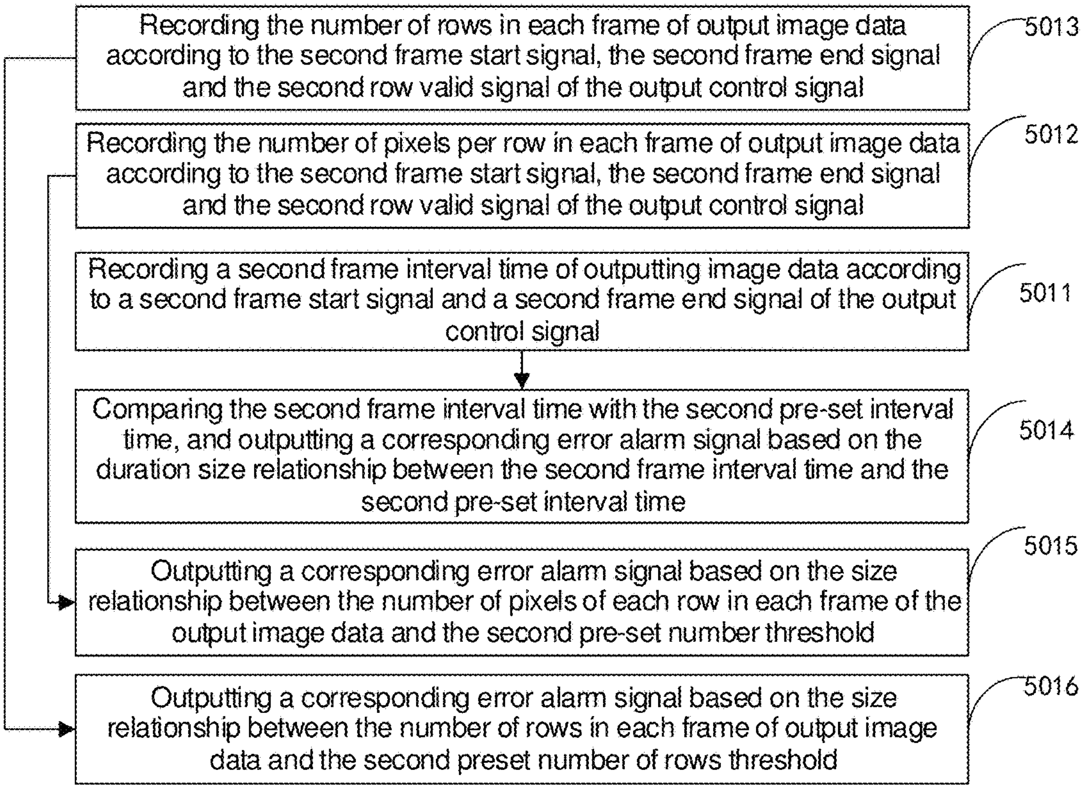
FIG. 15 is a flowchart of Step 501 provided in an exemplary embodiment of the present disclosure.

In an alternative example, FIG. 15 is a flowchart of Step 501 provided in an exemplary embodiment of the present disclosure. In this example, the output control signal includes a second frame start signal, a second frame end signal, and a second row valid signal of the output image data. The step 501 includes the following steps.

Step S011, recording a second frame interval time of the output image data according to the second frame start signal and the second frame end signal of the output control signal.

Step S012, recording the number of pixels per row in each frame of the output image data according to the second frame start signal, the second frame end signal and the second row valid signal of the output control signal.

Step S013, recording the number of rows in each frame of the output image data according to the second frame start signal, the second frame end signal and the second row valid signal of the output control signal.

Step S014, comparing the second frame interval time is compared with the second pre-set interval time, and outputting a corresponding error alarm signal based on the duration size relationship between the second frame interval time and the second pre-set interval time.

Step S015, outputting a corresponding error alarm signal based on the size relationship between the number of pixels per row in each frame of the output image data and the second pre-set number threshold.

Step S016, outputting a corresponding error alarm signal based on the size relationship between the number of rows in each frame of the output image data and the second preset number of rows threshold.

Any of protection methods of the image data processing module provided in embodiments of the present disclosure may be performed by any suitable device having data processing capabilities, including, but not limited to terminal equipment and servers, etc. Alternatively, any of the protection methods of the image data processing module provided in the embodiments of the present disclosure may be executed by a processor, for example the processor executing any of the protection methods of the image data processing module mentioned in the embodiments of the present disclosure by calling corresponding instructions stored in a memory. Alternatively, any of the protection methods of the image data processing module provided in embodiments of the present disclosure may be performed by hardware logic circuitry means. This will not be repeated below.

Exemplary Electronic Device

In the disclosed embodiments, an electronic device is also provided, including: a memory for storing a computer program; and a processor for executing a computer program stored in the memory, where the computer program, when executed, implements the protection method for the image data processing module according to any of the above-mentioned embodiments of the present disclosure.

Alternatively, the electronic device includes a protection apparatus of the image data processing module as provided in any of the above embodiments to implement the protection method for the image data processing module according to any of the above embodiments of the present disclosure.

Herein, at least one module in the protection apparatus of the image data processing module is implemented by a hardware logic circuit; or at least one unit of at least one module is implemented by a hardware logic circuit. Alternatively, at least one sub-unit of the at least one unit is implemented by the hardware logic circuit.

In order to improve real-time performance, each module, each unit under each module and each sub-unit under each unit in the device are all implemented by a hardware logic circuit, that is to say, the whole device is a hardware logic circuit.

Figure 16:
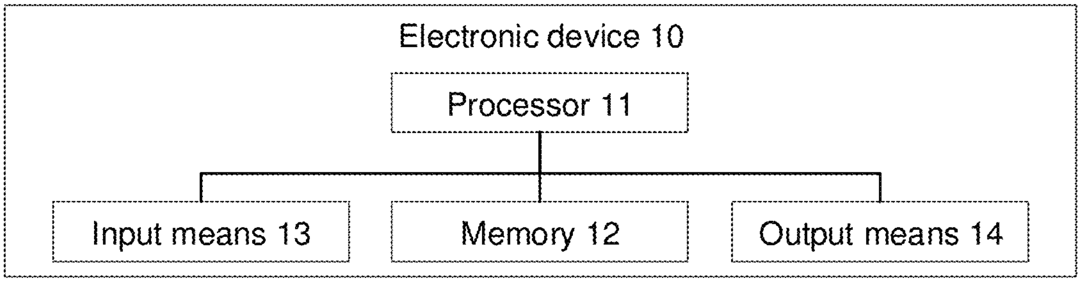
FIG. 16 is a structurally schematic diagram of one application embodiment of an electronic device of the present disclosure.

FIG. 16 is a structurally schematic diagram of one application embodiment of the electronic device of the present disclosure. In this embodiment, the electronic device 10 includes one or more processors 11 and a memory 12.

The processor 11 may be a central processing unit (CPU) or other form of processing unit having data processing capabilities and/or instruction execution capabilities, and may control other components in electronic device 10 to perform desired functions.

The memory 12 may include one or more computer program products, which may include various forms of computer-readable storage media, such as volatile memory and/or non-volatile memory. The volatile memory may for example include a random access memory (RAM) and/or a cache memory (cache) etc. The non-volatile memory may include, for example, a read only memory (ROM), a hard disk, a flash memory, etc. One or more computer program instructions may be stored on the computer-readable storage medium, and the processor 11 may execute the program instructions to perform the methods of the various embodiments of the disclosure described above and/or other desired functions. Various contents such as an input signal, a signal component, a noise component, etc. may also be stored in the computer-readable storage medium.

In one example, the electronic device 10 may further include an input means 13 and an output means 14, these components being interconnected via a bus system and/or other forms of connection means (not shown).

For example, the input means 13 may be a microphone or a microphone array as described above for capturing an input signal of a sound source. The input means 13 may also be an image acquisition sensor, such as a camera, for acquiring image data.

Furthermore, the input means 13 may include, for example, a keyboard, a mouse, etc.

The output means 14 may output various information to the outside, including the determined distance information, direction information, and the like. The output means 14 may include, for example, a display, speakers, a printer, a communications network and its connected remote output means, etc.

Of course, for simplicity, only some of the components of the electronic device 10 relevant to the present disclosure are shown in FIG. 16, omitting components such as buses, input/output interfaces, etc. In addition, the electronic device 10 may include any other suitable components depending on the particular application.

Figure 17:
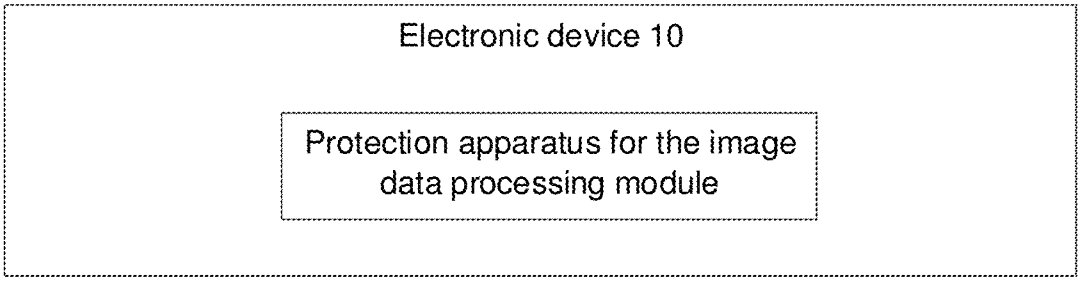
FIG. 17 is a structurally schematic diagram of another application embodiment of an electronic device of the present disclosure.

FIG. 17 is a structurally schematic diagram of another application embodiment of an electronic device of the present disclosure. In the present example, the electronic device 10 includes the protection apparatus of the image data processing module as provided in any of the above embodiments or examples, and may further include other related devices, which will not be described in detail herein. At least one module in the protection apparatus of the image data processing module is implemented by a hardware logic circuit; or at least one unit of at least one module is implemented by a hardware logic circuit. Alternatively, at least one sub-unit of the at least one unit is implemented by the hardware logic circuit.

Exemplarily, in order to improve real-time performance, all modules in the protection apparatus for the image data processing module are implemented by the hardware logic circuits.

Exemplary Computer Program Product and Computer-Readable Storage Medium

In addition to the methods and devices described above, embodiments of the present disclosure may also be a computer program product including computer program instructions which, when executed by a processor, cause the processor to perform steps in methods according to various embodiments of the present disclosure as described in the "Exemplary method" section of this specification above.

The computer program product may write program code for performing operations of embodiments of the present disclosure in any combination of one or more programming languages, including object-oriented programming languages, such as Java, C++, etc., and conventional procedural programming languages, such as the "C" language or similar programming languages. The program code may be executed entirely on the user computing device, partly on the user computing device, as a stand-alone package, partly on the user computing device and partly on the remote computing device, or entirely on the remote computing device or server.

Furthermore, embodiments of the present disclosure may also be a computer-readable storage medium having stored thereon computer program instructions which, when executed by a processor, cause the processor to perform steps in methods according to various embodiments of the present disclosure as described in the "Exemplary method" section of this specification above.

The storage medium of the present disclosure may also store data that is required to be stored by at least one hardware logic circuit of the protection apparatus for the image data processing module provided in the above-mentioned "Exemplary device" section of the present disclosure so that the hardware logic circuit can perform a corresponding function when operating. For example, the storage medium is a register of a hardware logic circuit, storing data of an initial configuration, or storing data required to be stored during an operating process, which is not limited thereto. The at least one hardware logic circuit may be a hardware logic circuit of a module in the device, or may be a hardware logic circuit of a unit under a module, or may be a hardware logic circuit of a sub-unit under a unit, without being limited thereto.

The computer-readable storage medium may take any combination of one or more readable media. The readable medium may be a readable signal medium or a readable storage medium. The readable storage medium may include, for example but not limited to, an electronic, magnetic, optical, electromagnetic, infrared, or semiconductor system, an apparatus, or a device, or any combination thereof. More specific examples (a non-exhaustive list) of readable storage media include an electrical connection having one or more wires, a portable disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above.

The general principles of the present disclosure have been described above in connection with specific embodiments. However, it should be noted that the advantages, advantages, effects, etc. mentioned in the present disclosure are merely exemplary and not limited thereto, and such advantages, advantages, effects, etc. must not be construed as being required by the various embodiments of the present disclosure. Furthermore, the particular details disclosed above are for purposes of illustration and description only and are not intended to limit, and the disclosure is not limited to have to be implemented with the particular details disclosed above.

Various embodiments are described in this specification in a progressive manner, with each embodiment focusing on differences from the other embodiments, and with reference to the same or similar parts of the various embodiments. The description is relatively simple with respect to the system embodiment since it substantially corresponds to the method embodiment, for which reference is made to the partial description of the method embodiment.

The block diagrams of devices, apparatuses, equipment, and systems referred to in this disclosure are merely illustrative examples and are not intended to require or imply that the connections, arrangements, and configurations shown in the block diagrams are required. The devices, apparatuses, equipment, and systems may be connected, arranged, configured in any manner, as will be appreciated by those skilled in the art. Words such as "including", "comprising", "having", and the like are open-ended words that mean "including, but not limited to", and are used interchangeably. The words "or" and "and" as used herein refer to the word "and/or" and may be used interchangeably therewith unless the context clearly indicates otherwise. As used herein, the word "such as" refers to and is used interchangeably with the phrase "such as, but not limited to".

It should also be noted that in the apparatuses, devices and methods of the present disclosure, the components or steps may be disassembled and/or recombined. Such decompositions and/or recombinations should be considered as equivalents of the present disclosure.

What is claimed is:

1. A protection apparatus for an image data processing module, comprising:

an input monitoring module configured as a hardware logic circuit, connected to an input end of the image data processing module, for monitoring an input of the image data processing module to obtain an input monitoring result;

an output monitoring module configured as a hardware logic circuit, connected to an output end of the image data processing module, for monitoring an output of the image data processing module to obtain an output monitoring result; and a monitoring result processing module configured as a hardware logic circuit, connected to the input monitoring module and the output monitoring module, respectively, for determining an operating state of the image data processing module based on the input monitoring result and the output monitoring result.

2. The apparatus according to claim 1, wherein the input monitoring module comprises:

an input signal component monitoring unit configured for sampling component signals of input image data of the image data processing module according to an input control signal of the image data processing module to obtain a first pixel value under each component, and obtaining the number of first pixel values included in each pixel range under each of the components as the input monitoring result according to a pixel range to which the first pixel value under each of the components belongs.

3. The apparatus according to claim 2, wherein the input signal component monitoring unit comprises:

a first sampling sub-unit configured for sampling the first pixel value under each component of the input image data;

a first judgement logic sub-unit, connected to the first sampling sub-unit, for judging the pixel range to which the first pixel value under each of the components belongs;

a first counting sub-unit, connected to the first judgement logic sub-unit, for counting the first pixel values included in each pixel range under each of the components to obtain the number of first pixel values included in each of the pixel ranges under each of the components; and a first writing sub-unit connected to the first counting sub-unit for writing the number of first pixel values included by each of the pixel ranges under each of the components to a data storage module.

4. The apparatus according to claim 1, wherein the input monitoring module further comprises:

an input control signal monitoring unit configured for monitoring whether the input control signal of the image data processing module is correct, and if not, outputting a corresponding error alarm signal.

5. The apparatus according to claim 4, wherein the input control signal comprises a first frame start signal, a first frame end signal and a first row valid signal of the input image data; and wherein the input control signal monitoring unit comprises:

a first frame counting sub-unit configured for recording a first frame interval time of the input image data according to the first frame start signal and the first frame end signal of the input control signal;

a first row counting sub-unit configured for recording the number of pixels per row in each frame of the input image data according to the first frame start signal, the first frame end signal and the first row valid signal of the input control signal;

a first column counting sub-unit configured for recording the number of rows in each frame of the input image data according to the first frame start signal, the first frame end signal and the first row valid signal of the input control signal;

a first comparison logic sub-unit, connected to the first frame counting sub-unit, for comparing the first frame interval time with a first pre-set interval time, and outputting a corresponding error alarm signal based on a duration size relationship between the first frame interval time and the first pre-set interval time;

a second comparison logic sub-unit, connected to the first row counting sub-unit, for outputting a corresponding error alarm signal based on a size relationship between the number of pixels of each row in each frame of the input image data and a first pre-set number threshold; and a third comparison logic sub-unit, connected to the first column counting sub-unit, for outputting a corresponding error alarm signal based on a size relationship between the number of rows in each frame of the input image data and a first preset number of rows threshold.

6. The apparatus according to claim 1, wherein the output monitoring module comprises:

an output signal component monitoring unit configured for sampling component signals of output image data of the image data processing module according to an output control signal of the image data processing module to obtain a second pixel value under each component, and obtaining the number of second pixel values included in each pixel range under each of the components as the output monitoring result according to a pixel range to which the second pixel value under each of the components belongs.

7. The apparatus according to claim 6, wherein the output signal component monitoring unit comprises:

a second sampling sub-unit configured for sampling a second pixel value under each component of the output image data;

a second judgement logic sub-unit, connected to the second sampling sub-unit, for judging a pixel range to which the second pixel value under each of the components belongs;

a second counting sub-unit, connected to the second judgement logic sub-unit, for counting second pixel values contained in each pixel range under each of the components to obtain the number of second pixel values included in each of the pixel ranges under each of the components; and a first output sub-unit, connected to the second counting sub-unit and the monitoring result processing module, for outputting the number of second pixel values included in each of the pixel ranges under each of the components to the monitoring result processing module;

wherein the monitoring result processing module is configured for determining an operating state of the image data processing module based on the input monitoring result and the number of second pixel values included in each of the pixel ranges under each of the components.

8. The apparatus according to claim 1, wherein the output monitoring module further comprises:

an output control signal monitoring unit configured for monitoring whether the output control signal of the image data processing module is correct, and if not, outputting a corresponding error alarm signal.

9. The apparatus according to claim 1, wherein the input monitoring result comprises the number of first pixel values included in each pixel range under each component corresponding to the input image data; and wherein the output monitoring result comprises the number of second pixel values included in each pixel range under each component corresponding to the output image data;

wherein the monitoring result processing module comprises:

a first processing unit configured for normalizing the number of second pixel values included in each pixel range under each of the components based on the scaling ratio of the output image data with respect to the input image data to obtain the normalized number of second pixel values included in each pixel range under each of the components;

a first comparison unit configured for comparing the normalized number of second pixel values included in each pixel range under each of the components with the corresponding number of the first pixel values to obtain a comparison result; and a second processing unit configured for judging whether an error occurs in the image data processing module according to the comparison result, and if so, outputting an error alarm signal.

10. The apparatus according to claim 1, wherein the output control signal monitoring unit comprises:

a second frame counting sub-unit, configured for recording a second frame interval time of the outputting image data according to a second frame start signal and a second frame end signal of the outputting a control signal;

a second row counting sub-unit, configured for recording the number of pixels per row in each frame of the output image data according to the second frame start signal, the second frame end signal and the second row valid signal of the output control signal;

a second column counting sub-unit, configured for recording the number of rows in each frame of output image data according to the second frame start signal, the second frame end signal and the second row valid signal of the output control signal;

a fourth comparison logic sub-unit, connected to the second frame counting sub-unit, configured for comparing the second frame interval time with the second pre-set interval time, and outputting a corresponding error alarm signal based on the relationship between the duration of the second frame interval time and a second pre-set interval time;

a fifth comparison logic sub-unit, connected to the second row counting sub-unit, configured for outputting a corresponding error alarm signal based on the size relationship between the number of pixels of each row in each frame of the output image data and the second pre-set number threshold; and a sixth comparison logic sub-unit, connected to the second column counting sub-unit, configured for outputting a corresponding error alarm signal based on the size relationship between the number of rows in each frame of output image data and the second preset number of rows threshold.

11. A protection method for an image data processing module, comprising:

monitoring, by an input monitoring module configured as a hardware logic circuit and connected to an input end of the image data processing module, an input of the image data processing module to obtain an input monitoring result;

monitoring, by an output monitoring module configured as a hardware logic circuit and connected to an output end of the image data processing module, an output of the image data processing module to obtain an output monitoring result; and determining, by a monitoring result processing module configured as a hardware logic circuit, an operating state of the image data processing module based on the input monitoring result and the output monitoring result, wherein the monitoring result processing module is connected to the input monitoring module and the output monitoring module, respectively.

12. The protection method according to claim 11, wherein the monitoring an input of the image data processing module to obtain an input monitoring result comprises:

sampling component signals of input image data of the image data processing module according to an input control signal of the image data processing module to obtain a first pixel value under each component, and obtaining the number of first pixel values included in each pixel range under each of the components as the input monitoring result according to a pixel range to which the first pixel value under each of the components belongs.

13. The protection method according to claim 12, wherein the sampling component signals of input image data of the image data processing module according to an input control signal of the image data processing module to obtain a first pixel value under each component, and obtaining the number of first pixel values included in each pixel range under each of the components as the input monitoring result according to a pixel range to which the first pixel value under each of the components belongs comprises:

sampling the first pixel value under each component of the input image data;

judging the pixel range to which the first pixel value under each of the components belongs;

counting the first pixel values included in each pixel range under each of the components to obtain the number of first pixel values included in each of the pixel ranges under each of the components; and writing the number of first pixel values included by each of the pixel ranges under each of the components to a data storage module.

14. The protection method according to claim 12, wherein the input control signal comprises a first frame start signal, a first frame end signal and a first row valid signal of the input image data; and wherein the monitoring whether the input control signal of the image data processing module is correct, and if not, outputting a corresponding error alarm signal comprises:

recording a first frame interval time of the input image data according to the first frame start signal and the first frame end signal of the input control signal;

recording the number of pixels per row in each frame of the input image data according to the first frame start signal, the first frame end signal and the first row valid signal of the input control signal;

recording the number of rows in each frame of the input image data according to the first frame start signal, the first frame end signal and the first row valid signal of the input control signal;

comparing the first frame interval time with a first pre-set interval time, and outputting a corresponding error alarm signal based on a duration size relationship between the first frame interval time and the first pre-set interval time;

outputting a corresponding error alarm signal based on a size relationship between the number of pixels of each row in each frame of the input image data and a first pre-set number threshold; and outputting a corresponding error alarm signal based on a size relationship between the number of rows in each frame of the input image data and a first preset number of rows threshold.

15. The protection method according to claim 11, wherein the monitoring an input of the image data processing module to obtain an input monitoring result further comprises:

monitoring whether the input control signal of the image data processing module is correct, and if not, outputting a corresponding error alarm signal.

16. The protection method according to claim 15, wherein the monitoring an output of the image data processing module to obtain an output monitoring result further comprises:

monitoring whether the output control signal of the image data processing module is correct, and if not, outputting a corresponding error alarm signal.

17. The protection method according to claim 11, wherein the monitoring an output of the image data processing module to obtain an output monitoring result comprises:

sampling component signals of output image data of the image data processing module according to an output control signal of the image data processing module to obtain a second pixel value under each component, and obtaining the number of second pixel values included in each pixel range under each of the components as the output monitoring result according to a pixel range to which the second pixel value under each of the components belongs.

18. The protection method according to claim 17, wherein the sampling component signals of output image data of the image data processing module according to an output control signal of the image data processing module to obtain a second pixel value under each component, and obtaining the number of second pixel values included in each pixel range under each of the components as the output monitoring result according to a pixel range to which the second pixel value under each of the components belongs comprises:

sampling a second pixel value under each component of the output image data;

judging a pixel range to which the second pixel value under each of the components belongs;

counting second pixel values included in each pixel range under each of the components to obtain the number of second pixel values included in each of the pixel ranges under each of the components; and outputting the number of second pixel values included in each of the pixel ranges under each of the components;

wherein the determining an operating state of the image data processing module based on the input monitoring result and the output monitoring result comprises determining an operating state of the image data processing module based on the input monitoring result and the number of second pixel values included in each of the pixel ranges under each of the components.

19. An electronic device, comprising a protection apparatus for the image data processing module, wherein the protection apparatus for the image data processing module comprises:

an input monitoring module configured as a hardware logic circuit, connected to an input end of the image data processing module, for monitoring an input of the image data processing module to obtain an input monitoring result;

an output monitoring module configured as a hardware logic circuit, connected to an output end of the image data processing module, for monitoring an output of the image data processing module to obtain an output monitoring result; and a monitoring result processing module configured as a hardware logic circuit, connected to the input monitoring module and the output monitoring module, respectively, for determining an operating state of the image data processing module based on the input monitoring result and the output monitoring result.

20. The electronic device according to claim 19, wherein the input monitoring module comprises:

an input signal component monitoring unit configured for sampling component signals of input image data of the image data processing module according to an input control signal of the image data processing module to obtain a first pixel value under each component, and obtaining the number of first pixel values included in each pixel range under each of the components as the input monitoring result according to a pixel range to which the first pixel value under each of the components belongs.

* * * * *